(12) United States Patent
Saroka

(10) Patent No.: US 6,511,271 B1
(45) Date of Patent: Jan. 28, 2003

(54) SPRING-LOADED OBJECT CLAMP

(76) Inventor: Kevin J. Saroka, 8 Johnson St., Bainbridge, NY (US) 13733

( * ) Notice: Subject to any disclaimer, the term of this patent is extended or adjusted under 35 U.S.C. 154(b) by 0 days.

(21) Appl. No.: 09/938,775

(22) Filed: Aug. 27, 2001

(51) Int. Cl.[7] .................................................. B60P 7/08
(52) U.S. Cl. ........................... 410/120; 410/34; 410/35; 410/77; 182/127
(58) Field of Search ............................. 410/120, 32, 34, 410/35, 38, 77; 248/503, 316.5; 224/324, 331, 323, 405, 570; 182/127

(56) References Cited

U.S. PATENT DOCUMENTS

| | | | | |
|---|---|---|---|---|
| 1,826,893 A | * | 10/1931 | Larsen | |
| 2,134,823 A | * | 11/1938 | Herrmann et al. | |
| 2,840,288 A | * | 6/1958 | Brodden | |
| 3,672,612 A | * | 6/1972 | Laing, Jr. | |
| 4,008,838 A | * | 2/1977 | Correll | |
| 4,339,064 A | * | 7/1982 | Ziaylek, Jr. | |
| 4,813,585 A | | 3/1989 | Nutt | |
| 4,827,742 A | * | 5/1989 | McDonald | |
| 5,154,258 A | * | 10/1992 | Krukow | 182/127 |
| 5,186,588 A | | 2/1993 | Sutton et al. | 410/120 |
| 5,603,591 A | * | 2/1997 | McLellan | 410/97 |
| 6,113,327 A | * | 9/2000 | Schrader | 410/97 |
| 6,135,686 A | * | 10/2000 | Chasen | 410/120 |
| 6,193,452 B1 | * | 2/2001 | Skiba | 410/38 |
| 6,299,396 B1 | * | 10/2001 | Chasen | 410/120 |

* cited by examiner

*Primary Examiner*—Stephen T. Gordon
(74) *Attorney, Agent, or Firm*—Salzman & Levy

(57) ABSTRACT

A locking clamp mechanism is designed for securing a ladder to a mounting rack that can be disposed on a roof or a side of a vehicle. The locking clamp mechanism is operative between an open and locked position in response to the position of an operating handle, which pivots from an open position over its pivot connection to a locked position. In pivoting, the handle draws a curved link over the top dead-center position of its pivot and secures a hook member that engages a rung of the ladder.

12 Claims, 2 Drawing Sheets

SPRING-LOADED OBJECT CLAMP

FIELD OF THE INVENTION

The present invention relates to clamping devices and, more particularly, to a spring-loaded clamp for securing a ladder to an over-head or side-mounted rack, especially on a vehicle.

BACKGROUND OF THE INVENTION

Ladders are one of the most essential pieces of equipment in the building trades. Ladders, however, have always posed a difficult problem with respect to storage and transportation, due to their elongated size. Ladders are usually mounted upon ladder racks that are commonly secured to the sides and roofs of trucks and vans. A typical ladder rack shown in the art is illustrated in the U.S. Pat. No. 4,813,585 issued to Nutt on Mar. 21, 1989 entitled LADDER RACK. The ladder rack of that patent comprises resilient clamps that vertically engage the ladder and pivot into a locking position. The patent eschews the use of biasing means, preferring to employ a slotted keyway and slide pin for locking the clamping arm into position.

One of the disadvantages of using a springless locking mechanism for the clamp is the possibility that harsh jolts, bumps, and travel vibrations will dislodge the securing device. In the event this occurs, the ladder could shift and become dislodged from its mounting rack.

In more recent times, U.S. Pat. No. 5,186,588 issued on Feb. 16, 1993 to Sutton et al entitled LADDER RACK LADDER LATCH discloses a ladder rack and securing mechanism having a spring-loaded latch to secure a clamp about a ladder. The mechanism in that patent has a spring-loaded handle, which pivots and forces the clamping hook to pivotally engage a rung of the ladder.

The problem with the Sutton ladder rack and latch is similar to the aforementioned device taught in the Nutt patent: there is a possibility that the ladder may dislodge when the truck or van traverses rough terrain. Shocks and bumps could conceivably shift the position of the handle, causing the clamp to become undone. This is so because the spring of the device acts directly upon the handle; there is nothing in the mechanism that seems able to prevent the handle from dislodging from its locking position.

The present invention reflects the discovery of an improved spring-loaded clamping device for securing a ladder to a roof or side-mounted ladder rack. The clamping mechanism features a pivot arm that connects to the ladder clamp via a spring, which biases the ladder clamp in a locked position. The clamp of the invention is not subject to dislodgement as are the aforementioned patented devices, by virtue of a pivot arm that travels over top-dead-center in achieving its locked position. Jolts, bumps, and traveling vibrations will not dislodge the pivot arm from its locked position.

SUMMARY OF THE INVENTION

In accordance with the present invention, a locking clamp mechanism secures a ladder to a roof or side-mounting rack that may be carried by a vehicle. The locking clamp mechanism comprises a fastener member that attaches to the mounting rack. A handle is pivotally mounted to the fastener member. A curved link is pivotally secured at one end to a mid-portion of the handle. A coiled spring is attached at one of its ends to an opposite end of the curved link. The other end of the spring is attached to a hook member that engages a rung of a ladder. The locking clamp mechanism is operative between an open and locked position in response to the position of the handle, which pivots from an open position over its pivot connection to a locked position. In pivoting, the handle draws the curved link over a top, dead-center position of its pivot, thus securing the hook member in a locked position with respect to said rung of the ladder.

It is an object of this invention to provide an improved clamping mechanism for a ladder that is to be secured to a mounting rack that can be disposed upon a vehicle.

It is another object of the invention to provide a spring-loaded clamping mechanism that locks the clamp holding a ladder to a rack mount by virtue of its linkage, whose motion traverses past the top dead-center of the activating pivot point.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like components and elements of the apparatus of this invention will bear the same designations or numbering throughout the figures.

DESCRIPTION OF THE PREFERRED EMBODIMENT

Generally speaking, the invention features a locking clamp mechanism for securing a ladder to a mounting rack that can be disposed on a roof or on the side of a vehicle or within a garage or utility shed. The locking clamp mechanism is operative between open and locked positions in response to the position of an operating handle, which pivots from an open position over its pivot connection to a locked position. In pivoting, the handle draws a curved link over the top dead-center position of its pivot and secures a hook member that engages a rung of the ladder.

Figure 1:
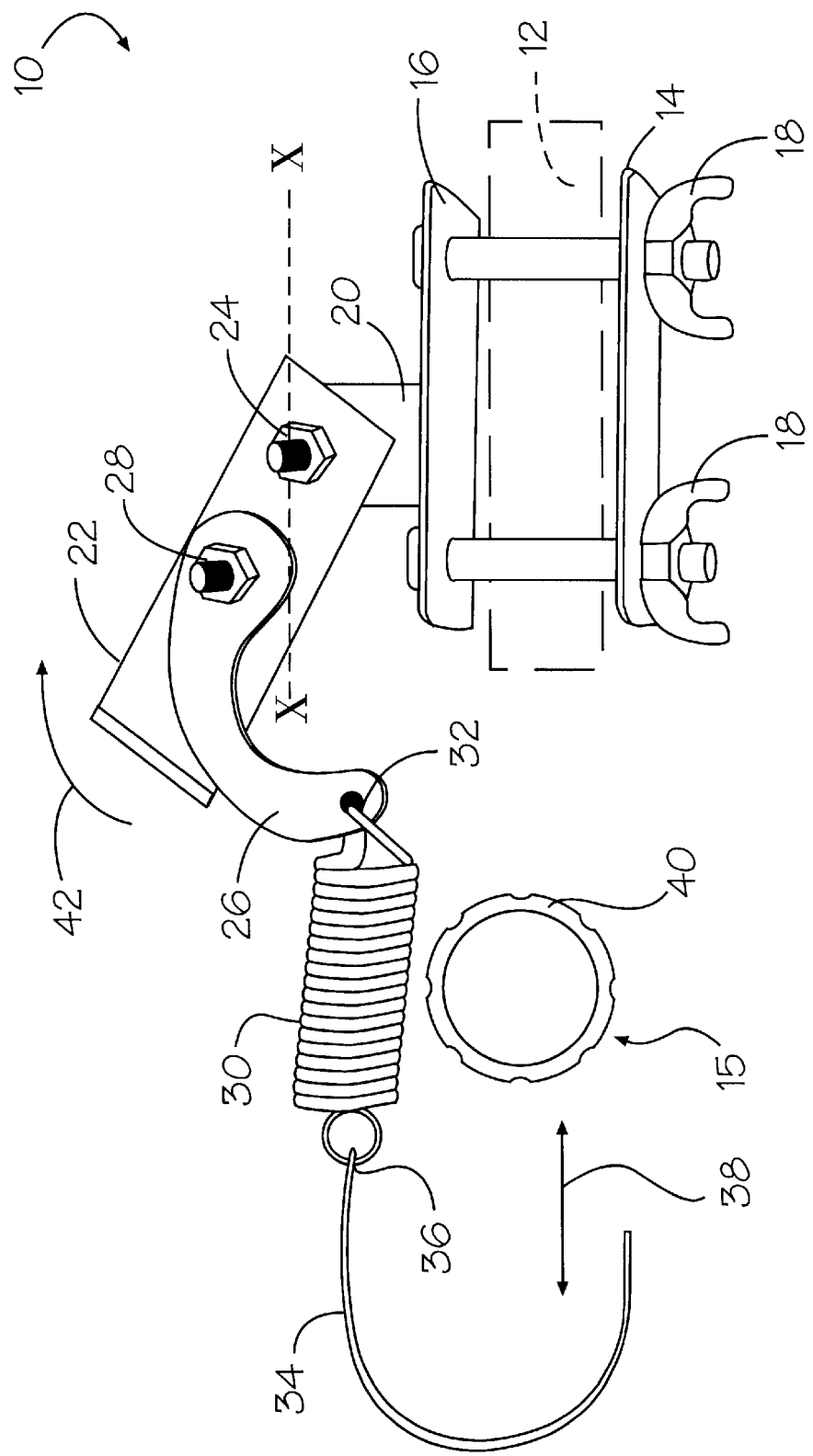
FIG. 1 illustrates a front, in situ view of the ladder clamping mechanism of this invention, with its clamping linkage in an open position.

Now referring to FIG. 1, the ladder clamping mechanism 10 of this invention is illustrated in an open position with respect to a ladder 15 to be secured to a mounting rack. The clamping mechanism 10 is secured to a frame 12 of the mounting rack disposed, for example, on the roof of a vehicle, not shown. The clamping mechanism 10 is secured to the frame 12 by means of a pair of fastener bars 14 and 16, respectively, which are secured by a pair of bolts and wing nuts 18. A flange 20 extends from the upper fastener bar 16.

An activating handle 22 is pivotally mounted to the flange 20 by pivot pin 24. A link 26 is pivotally mounted to the activating handle 22 by a centered pivot pin 28. The link 26 is curved so that its axis of activation X—X does not pass through the link 26, thus making it insensitive to external forces tending to dislodge the link from its locked position. The axis of activation X—X is designed to horizontally pass through the pivot pin 24 that secures the activating handle 22 to the flange 20. By designing the activation axis X—X to pass outside of the curved link 26, the link 26 can then pass over the top dead-center and secure the ladder 15 without being susceptible to external influences such as bumps, jarring, and vehicular vibration, as explained hereinafter.

A coil spring 30 is attached to the curved link 26 at its distal end 32. The coil spring 30 is attached to a ladder securing hook 34 at its proximal end 36. The ladder securing hook 34 is designed to laterally move (arrow 38) into engagement with the rung 40 of ladder 15 when the clamping mechanism 10 is in its locked position, as is illustrated in FIG. 2.

Figure 2:
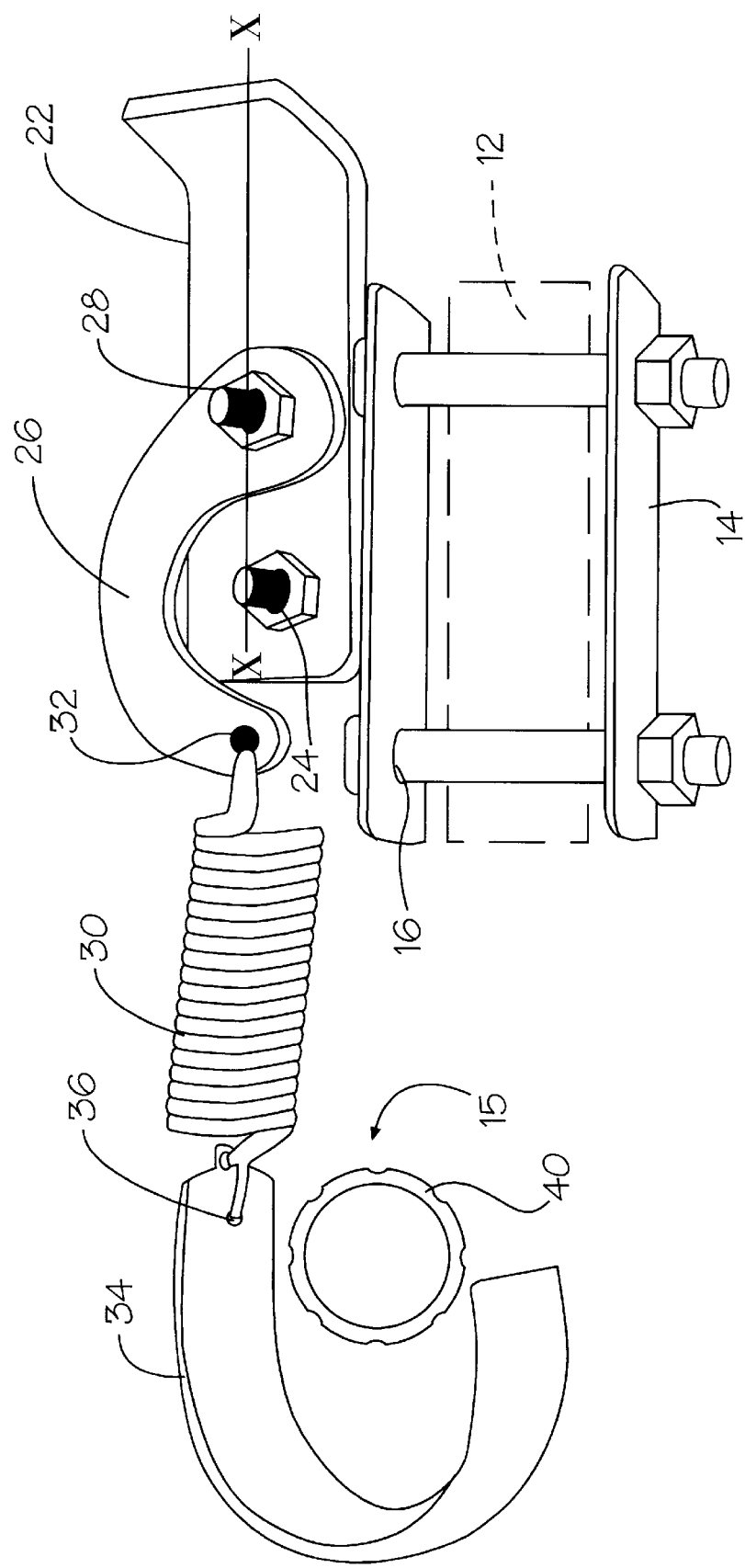
FIG. 2 depicts a front, in situ view of the ladder clamping mechanism shown in FIG. 1, with its clamping linkage in a locked position, having moved past its top dead-center position.

The clamping mechanism 10 is activated by pulling upon activating handle 22, which causes the handle to pivot clockwise (arrow 42) about pivot pin 24 to the locked position shown in FIG. 2.

Referring to FIG. 2, it is observed that activating handle 22 has been pivoted all the way to the right, causing the curved link 26 to pull upon the coil spring 30, which in turn pulls the securing hook 34 into engagement with the rung 40 of the ladder 15. It will also be observed in this figure that the curved link 26 does not pass through the activation axis X—X, thus making the clamping mechanism 10 immune to external disturbances. Also, it will be noted that the pivoting of the handle 22 and the link 26 causes the link 26 to pass over the top dead-center (pivot point 24), thus making the lock-up of the engagement of the hook 34 and the rung 40 very secure.

In other words, the force created by spring 30, which biases the hook 34 into engagement with the ladder rung 40, passes through axis X—X, but does not influence link 26. Thus, any external forces that tend to dislodge link 26 will not disturb the locking force of the spring 30. Put in still another way, it would be very difficult to dislodge the link 26 such that it would be forced to renegotiate its pivotal movement back past the top dead-center.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A ladder clamping mechanism for securing a ladder to a mounting rack, comprising:

fastener means for securing said ladder clamping mechanism to a mounting rack;

an activating handle pivotally supported by said fastener means;

a link pivotally moveable about a mid-portion of said activating handle between an open position and a locked position, said link moving past a top dead-center position between said open position and said locked position;

biasing means connected to said link; and a hook for engaging a ladder, said hook being connected to said biasing means at a proximal end of said biasing means, whereby pivotal movement of said link by activation of said activating handle causes said hook to engage the ladder and the link to be locked into the locked position.

2. The ladder clamping mechanism in accordance with claim 1, further comprising means defining an axis of activation, and wherein said link does not pass through said axis of activation in its locked position, thus making the engagement of the hook with the ladder secure.

3. The ladder clamping mechanism in accordance with claim 1, further comprising means defining a pivot point for said activating handle, and wherein said pivot point defines a top dead-center in the movement of said link from its open position to its locked position.

4. The ladder clamping mechanism in accordance with claim 2, wherein said link is curved, and does not pass through said axis of activation, thus making the link insensitive to external forces tending to dislodge said link from its locked position.

5. The ladder clamping mechanism in accordance with claim 1, wherein said fastener means comprises a pair of bars and fastener bolts.

6. The ladder clamping mechanism in accordance with claim 1, wherein said biasing means comprises a coil spring.

7. A ladder clamping mechanism for securing a ladder to a mounting rack, comprising:

fastening means for affixing said ladder clamping mechanism to a mounting rack;

an elongated activating handle pivotally supported by said fastener means;

a link pivotally moveable about a mid-portion of said activating handle between an open position and a locked position, said link moving past a top dead-center position between said open position and said locked position;

a spring connected to said link; and a member for engaging a ladder, said member being connected to said spring at a proximal end of said spring, whereby pivotal movement of said link by activation of said activating handle causes said member to engage the ladder, and the link to be locked into the locked position.

8. The ladder clamping mechanism in accordance with claim 7, further comprising means defining an axis of activation, and wherein said link does not pass through said axis of activation in its locked position, thus making the engagement of the member with the ladder secure.

9. The ladder clamping mechanism in accordance with claim 7, further comprising means defining a pivot point for said activating handle, and wherein said pivot point defines a top dead-center in the movement of said link from its open position to its locked position.

10. The ladder clamping mechanism in accordance with claim 8, wherein said link is curved, and does not pass through said axis of activation, thus making the link insensitive to external forces tending to dislodge said link from its locked position.

11. The ladder clamping mechanism in accordance with claim 7, wherein said fastener means comprises a pair of bars and fastener bolts.

12. The ladder clamping mechanism in accordance with claim 7, wherein said spring comprises a coil spring.

* * * * *